United States Patent
Harrison

(10) Patent No.: US 6,539,587 B2
(45) Date of Patent: Apr. 1, 2003

(54) EYEGLASS HOLDER

(76) Inventor: Shirley Harrison, 3287 Fairhaven La., Sarasota, FL (US) 34239

( * ) Notice: Subject to any disclaimer, the term of this patent is extended or adjusted under 35 U.S.C. 154(b) by 0 days.

(21) Appl. No.: 09/907,997

(22) Filed: Jul. 18, 2001

(65) Prior Publication Data

US 2003/0014845 A1 Jan. 23, 2003

(51) Int. Cl.⁷ .............................. A44B 21/00; A45F 5/00
(52) U.S. Cl. .............................................. 24/3.3; 24/3.1
(58) Field of Search .............................. 24/3.1, 3.3, 3.4, 24/3.7, 3.13, 3.8; 63/3, 3.1, 4, 10, 11; D3/243; D11/80, 79; 2/445; 224/251, 255, 256, 600, 603, 604, 605, 607, 615, 616, 623

(56) References Cited

U.S. PATENT DOCUMENTS

| | | | |
|---|---|---|---|
| 2,634,470 A | | 4/1953 | Grafft |
| 3,956,795 A | | 5/1976 | Kosakai |
| D264,272 S | * | 5/1982 | Brinley .................... D2/415 |
| D265,179 S | * | 6/1982 | Musillo .................... D11/91 |
| D303,508 S | * | 9/1989 | Yoshida .................... D11/79 |
| 4,894,887 A | | 1/1990 | Ward, II |
| 5,033,612 A | * | 7/1991 | Bivins ...................... 24/3.3 X |
| 5,078,484 A | | 1/1992 | Vaughn |
| 5,305,934 A | | 4/1994 | Grey |
| 5,319,838 A | | 6/1994 | Eppenauer |
| D355,388 S | * | 2/1995 | Barrow .................... D11/79 |
| 5,551,126 A | | 9/1996 | Wallo |
| 5,842,613 A | * | 12/1998 | White ...................... 24/3.1 X |
| 5,860,191 A | * | 1/1999 | Sieger ........................ 24/3.3 |
| 5,893,198 A | | 4/1999 | DeCotis |
| 5,983,459 A | * | 11/1999 | Goldenberg ................. 24/3.3 |
| 6,039,173 A | * | 3/2000 | Crow ...................... 24/3.3 X |
| 6,070,303 A | * | 6/2000 | Macy et al. ................. 24/3.3 |

FOREIGN PATENT DOCUMENTS

GB 2 197 354 A * 5/1988

* cited by examiner

Primary Examiner—J. J. Swann
Assistant Examiner—Ruth C. Rodriguez
(74) Attorney, Agent, or Firm—Charles J. Prescott

(57) ABSTRACT

An eyeglass holder adapted to be used with a pair of eyeglasses. The eyeglass holder includes an elongated, narrow generally V-shaped substantially rigid loop having an open central area defined by two upwardly diverging slender side portions or legs connected together at a narrow distal lower tip of the loop. An eyelet is provided connected to a top portion of the loop so that the eyeglass holder may be suspended about the neck. The open central area is of a size sufficient for a temple side piece of a pair of folded eyeglasses to be hung over and receive support between the side portions at a point just above the distal lower tip whereby the temple side piece becomes sufficiently wedged within the loop so as to enhance retention of the eyeglasses in the eyeglass holder during active body movement.

4 Claims, 4 Drawing Sheets

US 6,539,587 B2

EYEGLASS HOLDER

BACKGROUND OF THE INVENTION SCOPE OF INVENTION

This invention relates generally to eyeglass holders, and more particularly to an eyeglass holder worn about the neck and having enhanced eyeglass retention properties. PRIOR ART When eyeglasses are not in use, they are often carried in a protective case, in a pocket or purse or about the neck by an elongated lanyard connected to each end of the side temples of the eyeglasses. Only in the later case are the eyeglasses ready for quick use and easily accessible.

However, with the use of the lanyard, the eyeglasses themselves will dangle and swing violently with body movement and are also typically in an orientation where the lenses are somewhat horizontally oriented and serve as a secondary bib or tray to collect food and other particles that drop either from one's hands or mouth.

Applicant is aware of a number of devices which are intended to hold the eyeglasses in a readily accessible position at the front of the upper torso and are also intended to be somewhat restrictive as to the movement of eyeglasses when supported in these devices. However, applicant has found that all of these devices in one form or another are lacking in their ability to truly retain the folded eyeglasses in upright orientation about the pivotal stem joint of the eyeglass frames during normal body and torso movement.

The following prior art is included in such previously patented devices which exhibit such a shortcoming:.

U.S. Pat. No. 2,634,470 to DeGrafft, Jr.
U.S. Pat. No. 3,956,795
U.S. Pat. No. 4,894,887 to Ward, II
U.S. Pat. No. 5,078,484 to Vaughn
U.S. Pat. No. 5,305,934 to Grey
U.S. Pat. No. 5,319,838 to Eppenauer
U.S. Pat. No. 5,551,126 to Wallo
U.S. Pat. No. 5,893,198 to DeCotis The present invention provides a very simple and decorative eyeglass holder adapted to be used with a pair of eyeglasses for supportively retaining a pair of folded eyeglasses in a generally vertical position against the front upper torso of the user. The present invention further provides for enhanced retention of the eyeglasses within the holder during active and aggressive body movement so that the eyeglasses remain fully engaged and supported within the eyeglass holder of the present invention.

BRIEF SUMMARY OF THE INVENTION

This invention is directed to an eyeglass holder adapted to be used with a pair of eyeglasses. The eyeglass holder includes an elongated, narrow generally V-shaped substantially rigid loop having an open central area defined by two upwardly diverging slender side portions or legs connected together at a narrow distal lower tip of the loop. An eyelet is provided connected to a top portion of the loop so that the eyeglass holder may be suspended about the neck. The open central area is of a size sufficient for a temple side piece of a pair of folded eyeglasses to be hung over and receive support between the side portions at a point just above the distal lower tip whereby the temple side piece becomes sufficiently wedged within the loop so as to enhance retention of the eyeglasses in the eyeglass holder during active body movement.

It is therefore an object of this invention to provide an eyeglass holder adapted to be used with a pair of eyeglasses for supporting the eyeglasses in a generally upright orientation against the front upper torso and clothing of the user.

It is another object of this invention to provide an eyeglass holder for eyeglasses with enhanced retention characteristics so that the eyeglasses are much less prone to be inadvertently dislodged from the holder itself.

It is still another object of this invention to provide an eyeglass holder adapted to be supported by a continuous necklace about the neck and for retaining a pair of eyeglasses in a secure and substantially undislodgeable upright orientation against the front of the torso of the user.

In accordance with these and other objects which will become apparent hereinafter, the instant invention will now be described with reference to the accompanying drawings.

DETAILED DESCRIPTION OF THE INVENTION

Figure 1:
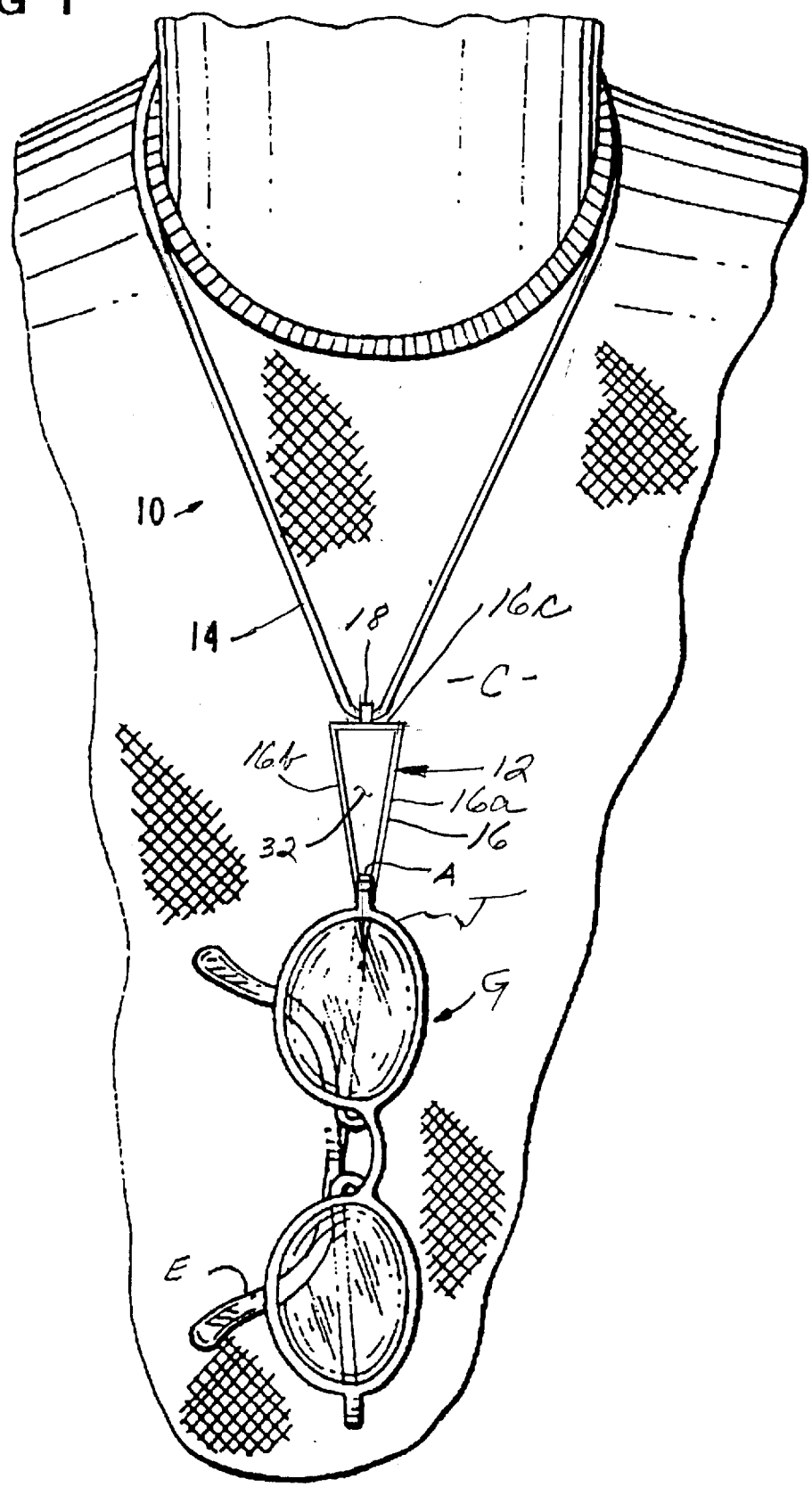
FIG. 1 is a front perspective view of the invention in use attached to a necklace surrounding the neck of a user.

Referring now to the drawings, the invention in a preferred embodiment thereof is shown generally at numeral 10 attached to a necklace 14 formed of flexible ornamental material and adapted in size to be fitted about the neck of a user. The invention 10 further includes an elongated eyeglass holder shown generally at 12 made attachable to the necklace 14 by an eyelet 18 connected at the upper end 16c of the eyeglass holder 12.

The eyeglass holder 12 includes an elongated rigid or semi-rigid narrowly V-shaped loop 16 having upwardly divergent side portions or legs 16a and 16b which are connected together at a lower distal tip 22 of loop 16. The eyelet 18 is connected to an upper horizontal portion 16c of the frame or loop 16 which, in combination with side portions 16a and 16b, define an open central area 32.

Figure 2:
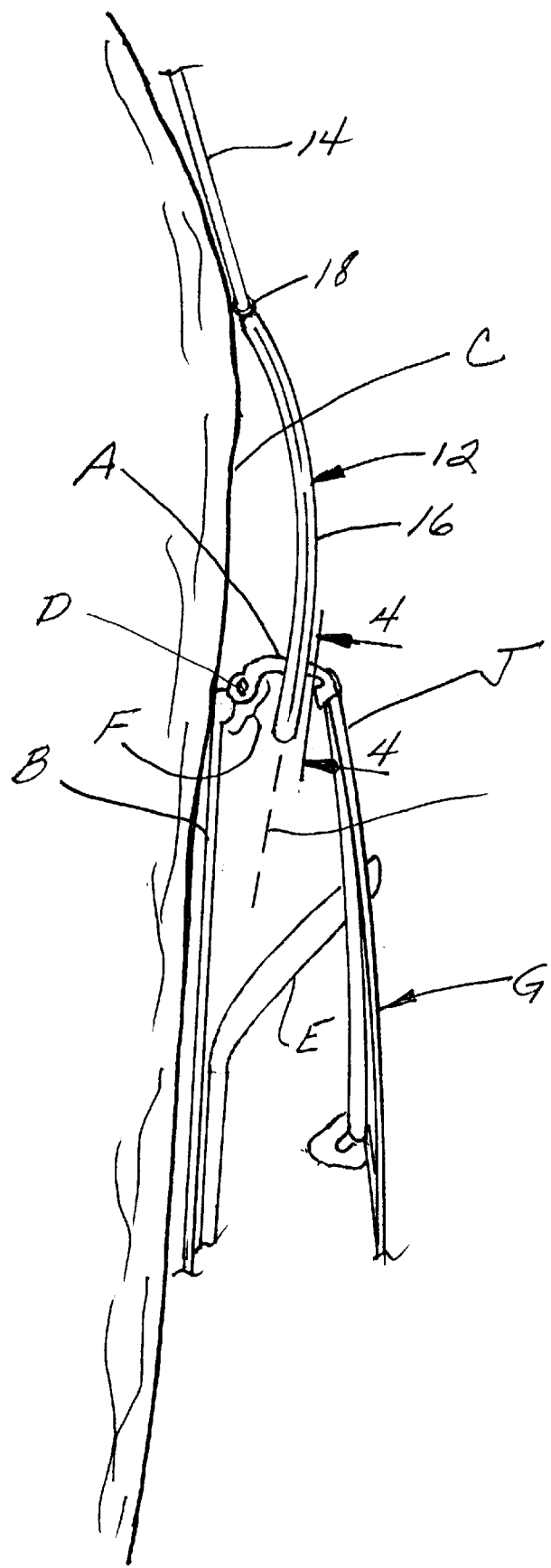
FIG. 2 is a side elevation view of a portion of FIG. 1.
Figure 3:
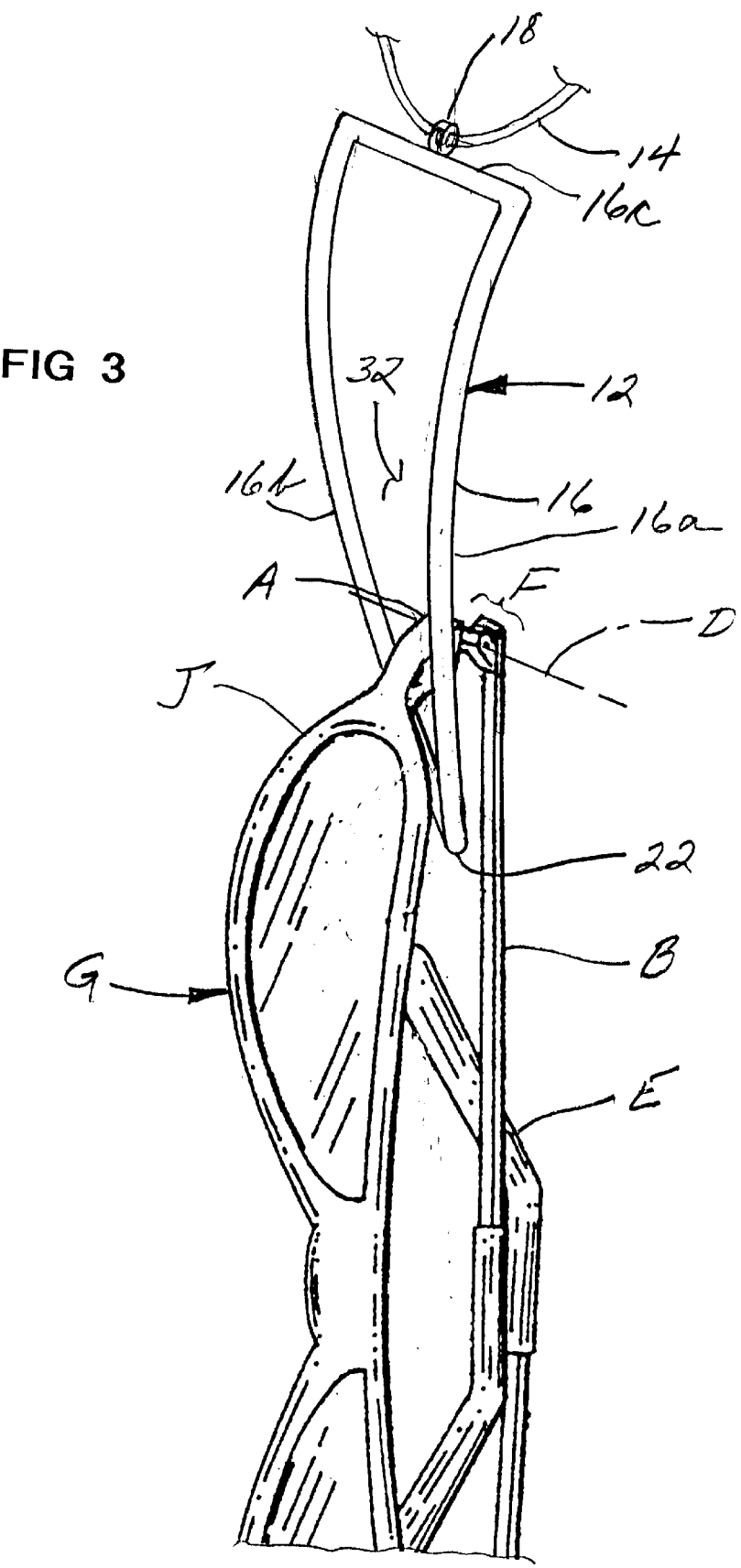
FIG. 3 is a perspective view of the invention as shown in FIG. 1.

When viewed from the side as best seen in FIGS. 2 and 3, the frame 16 has an outwardly arcuate or convex configuration with respect to the torso C of the user for enhanced retention properties of a pair of eyeglasses shown generally at G, which properties for retention are described in more detail herebelow.

Figure 4:
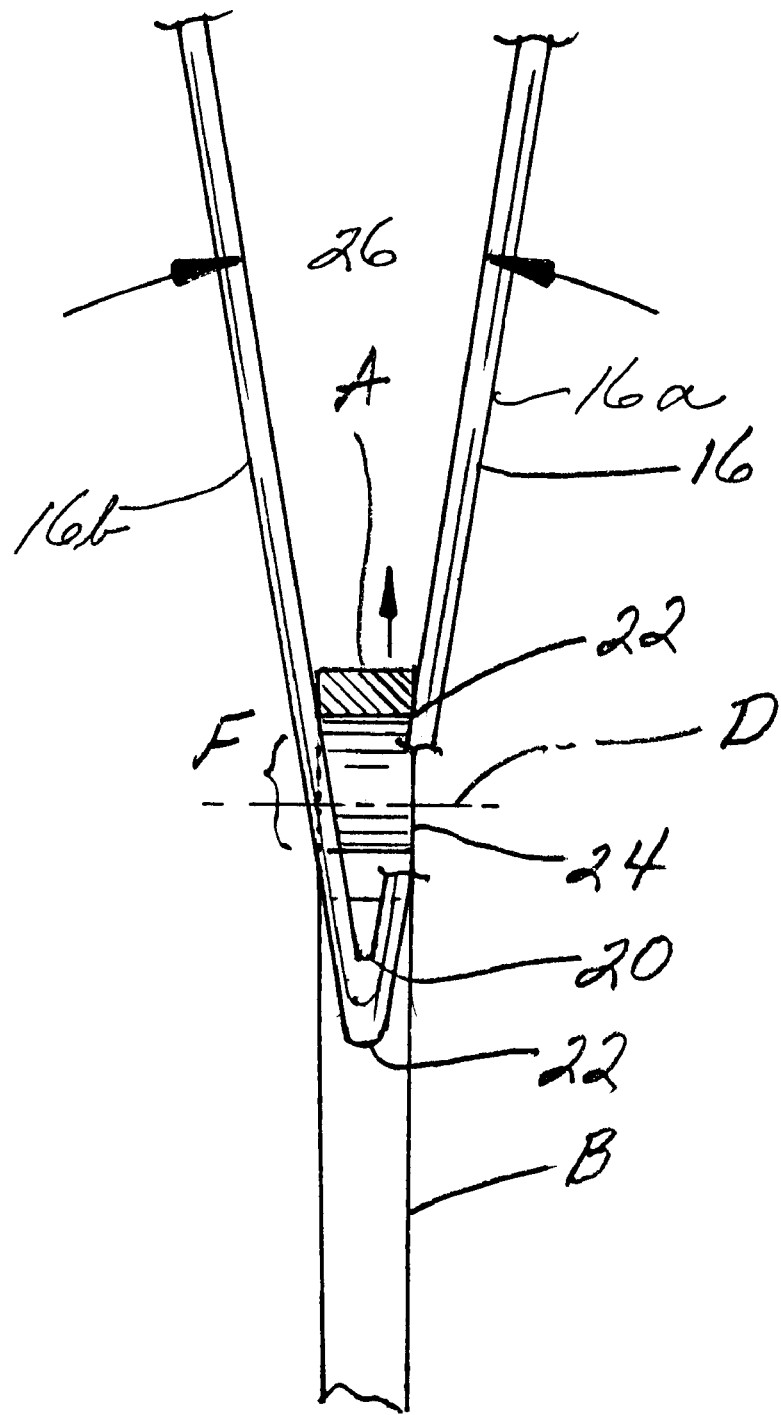
FIG. 4 is an enlarged view in the direction of arrows 4—4 in FIG. 2.

The present invention 10 is adapted for retaining the eyeglasses G in a folded orientation and upright with respect to the user as shown in all figures. The eyeglasses G include elongated temple side pieces B which are each pivotally connected about an axis D as best seen in FIGS. 2, 3 and 4, the pivotal connection being made to an extension A of the eyeglass frame J. Frame portion A extends somewhat orthogonally with respect to the eyeglass frame J itself. It is this frame portion A of the eyeglasses G which applicant's invention best utilizes for enhanced retention. Although the hinge portion F is generally of the same width as the frame portion A, as best seen in FIG. 4, the frame portion F becomes wedged against the divergent side portions 16a and 16b at points 22 as seen in FIG. 4.

With frame portion F wedged between these side portions 16a and 16b, the eyeglasses G cannot become dislodged from this snug wedging engagement due to the fact that, as best seen in FIGS. 2 and 4, the hinge portion F must not only move laterally away from the torso C and the eyeglass holder 12, but also must be raised sufficiently so that this hinge portion F will pass through the narrowest wedging point 22 between the side portions 16a and 16b.

Although it is preferred that the frame 16b be elongated in V-shape and continuous as by the upper horizontal portion 16c, other arrangements of this structure wherein the frame 16 is not continuous yet embodies all of the above-described features is intended to be within the scope of this invention.

An important aspect of the present invention, i.e. the enhanced retention of the stem of the eyeglasses themselves, is achieved as best seen in FIG. 4 by minimizing the divergent angle 26 between the straight side portions 16a and 16b in front elevation view. When the frame portion F makes contact with, and wedges between, the side portions 16a and 16b at 22, an interference of the hinge portion F is created such that, to remove the eyeglasses G from this wedging engagement, they must be lifted upwardly. The upward movement of the eyeglasses G while being suspended around the neck of the user as above described is virtually impossible to occur.

The preferred angle of divergence 26 between the side portions 16a and 16b is in the range of 20°. A divergent angle substantially greater than 30° will lose this wedging action benefit shown and described in FIG. 4 and the eyeglasses will be no better retained during body and torso movement than other prior art devices.

While the instant invention has been shown and described herein in what are conceived to be the most practical and preferred embodiments, it is recognized that departures may be made therefrom within the scope of the invention, which is therefore not to be limited to the details disclosed herein, but is to be afforded the full scope of the claims so as to embrace any and all equivalent apparatus and articles.

What is claimed is:

1. An eyeglass holder adapted to be used with a pair of eyeglasses comprising:

an elongated, narrow generally V-shaped substantially rigid loop having an open central area defined by two upwardly diverging side portions connected together at a narrow distal lower tip of said loop;

an eyelet connected to a top portion of said loop so that said eyeglass holder may be suspended about the neck;

said open central area of a size sufficient for a temple side piece of a pair of eyeglasses to be hung over and receive support between said side portions at a point just above said distal lower tip whereby the temple side piece becomes sufficiently wedged within said loop so as to enhance retention of the eyeglasses in said eyeglass holder;

said loop having a generally arcuate shape in side elevation whereby said distal lower tip becomes oriented substantially parallel to or toward a user's upper torso when the eyeglasses are hung on said eyeglass holder so as to further enhance retention of the eyeglasses in said eyeglass holder.

2. An eyeglass holder as set forth in claim 1, wherein:

said side portions are angularly oriented one to another at an angle of divergence of up to about 20°.

3. An eyeglass holder as set forth in claim 1, wherein:

said side portions are angularly oriented one to another at an angle of divergence of up to about 30°.

4. An eyeglass holder adapted to be used with a pair of eyeglasses comprising:

an elongated, narrow generally V-shaped substantially rigid continuous loop having an open central area and two upwardly diverging substantially straight side portions connected together at a narrow distal lower tip of said loop;

an eyelet connected to a top portion of said loop so that said eyeglass holder may be suspended about the neck on a necklace;

said open central area having a size sufficient for a temple side piece of the eyeglasses to be hung over and receive support between said side portions at a point just above said distal lower tip whereby the temple side piece becomes sufficiently wedged within said frame so as to enhance retention of the eyeglasses in said eyeglass holder;

said side portions being angularly oriented one to another at an angle of divergence of up to about 30° and the loop has a generally arcuate shape in the side elevation.

* * * * *